June 23, 1959 E. K. GRUNDY 2,891,638
CEILINGS, WALLS, PARTITIONS, DOORS, AND LIKE STRUCTURES
Filed Aug. 17, 1955 3 Sheets-Sheet 1
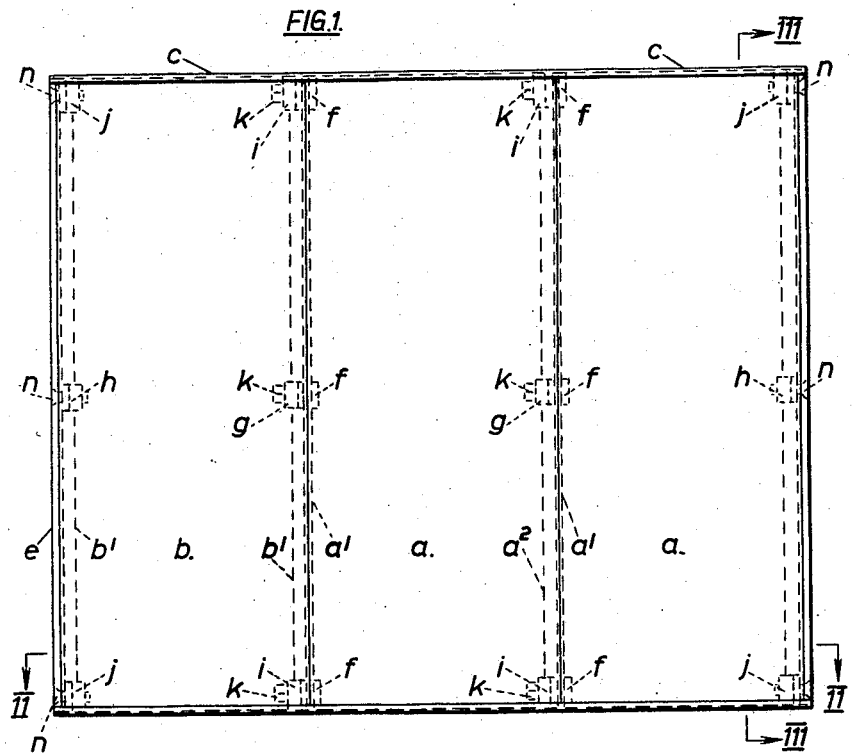
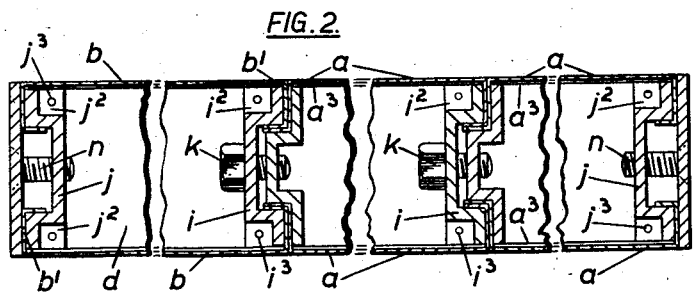
Inventor
EDWARD KELVIN GRUNDY, DEC'D.
By MAY LILIAN GRUNDY AND
JAMES MILTON GRUNDY, EXECUTORS
Attorneys June 23, 1959  E. K. GRUNDY  2,891,638
CEILINGS, WALLS, PARTITIONS, DOORS, AND LIKE STRUCTURES
Filed Aug. 17, 1955  3 Sheets-Sheet 2
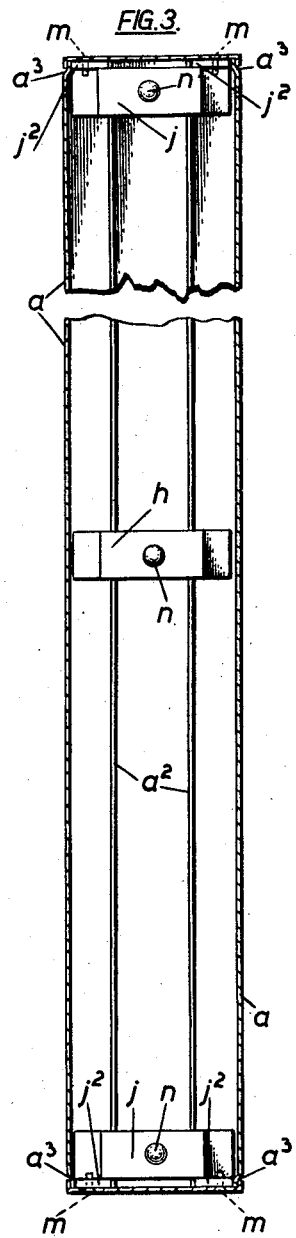
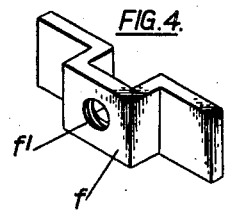
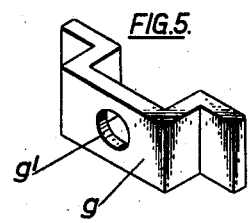
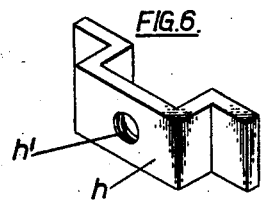
Inventor
EDWARD KELVIN GRUNDY, DEC'D.
By MAY LILIAN GRUNDY AND
JAMES MILTON GRUNDY, EXECUTORS
Attorneys June 23, 1959  E. K. GRUNDY  2,891,638
CEILINGS, WALLS, PARTITIONS, DOORS, AND LIKE STRUCTURES
Filed Aug. 17, 1955  3 Sheets-Sheet 3
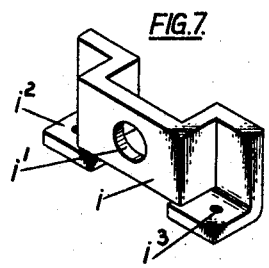
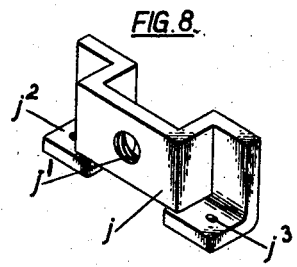
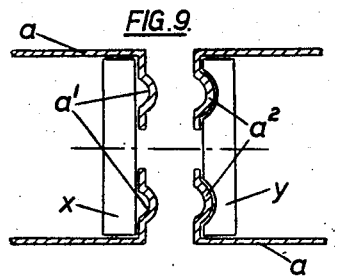
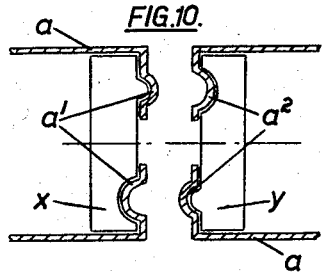
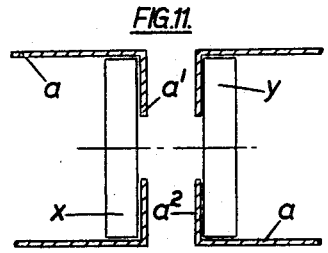
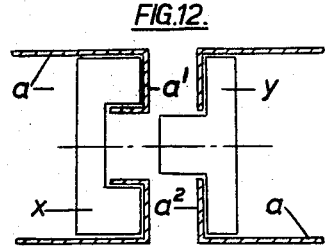
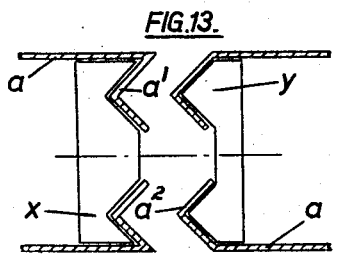
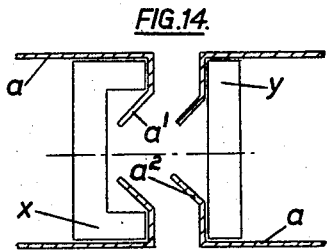
Inventor
EDWARD KELVIN GRUNDY, DEC'D.
By MAY LILIAN GRUNDY AND
JAMES MILTON GRUNDY, EXECUTORS
Linton and Linton Attorneys United States Patent Office 2,891,638
Patented June 23, 1959

2,891,638

CEILINGS, WALLS, PARTITIONS, DOORS AND LIKE STRUCTURES

Edward Kelvin Grundy, deceased, late of St. Helens, England, by May Lilian Grundy and James Milton Grundy, executors, St. Helens, England Application August 17, 1955, Serial No. 528,993

Claims priority, application Great Britain August 20, 1954

4 Claims. (Cl. 189—34)

This invention relates to ceilings, walls, partitions, doors, and like structures, and has for its object to provide a new or improved method of, and means for, fabricating a cavity structure which is strong, is readily assembled by unskilled or semi-skilled labour, lends itself particularly to sound, heat and cold insulating purposes, and which can be built to any required dimensions.

A cavity structure, according to the invention, comprises a number of pre-shaped or conformed panel units which are assembled in one or more spaced-apart pairs (to form a cavity), and are connected one to the other by clamping means disposed internally—and therefore unseen—of the completed structure.

Each panel unit consists of a sheet of ferrous or non-ferrous metal, or any other suitable material or substance, which, in its simplest embodiment has both vertical edges formed with a right angle bend. In assembling said units, pairs of same are spacedly arranged in opposed parallel disposition with their angled edges inwardly turned; and clamping means, which maintain the units in said spaced disposition and secure the angled ends of one pair to the angled ends of the next adjacent pair, are provided at top and bottom and at suitable intermediate positions. The width of the clamping means determines the width of the cavity formed between the units.

In a preferred form, each unit has one vertical edge turned back upon itself through two right angles i.e. is substantially ⊐-shaped, and the other edge of said unit is approximately ⌐-shaped. The clamping means comprises two members shaped to correspond with the angled edges of the units, and which are bolted together to clamp said edges together, whereby the units comprising a cavity structure are firmly associated one with another and are positively prevented from dissociation both laterally and longitudinally.

The ends of a cavity structure, according to the invention, are closed by end plates secured in position by clamping means, as hereinbefore described, with the exception that flush-fitting countersunk screws are used in lieu of bolts; or said end plates may be clipped into position. Capping and footing plates may be secured in position by means of screws adapted to enter screw-threaded apertures provided for the purpose in the clamping means used at the top and bottom of the assembly. Openings for lights, doors, etcetera, are readily provided for by adjusting the lengths of the units concerned and fitting thereto clamping means as used for securing the capping and footing plates.

I will further describe the invention with the aid of the accompanying explanatory drawings which illustrate by way of example only and not of limitation several modes of embodiment.

In said drawings:

Fig. 1 is a side elevation of a cavity structure according to one embodiment.

Fig. 2 is a section taken as on line II—II of Fig. 1 and,

Fig. 3 is a section taken as on line III—III Fig. 1.

Figs. 4 to 8, inclusive, are isometric views of the clamping members used in the structure of Figs. 1 to 3.

Figs. 9 to 14, inclusive, are fragmentary views of alternative forms of joints which may be employed.

In the several views like characters of reference denote like or equivalent parts wherever they occur.

Referring now to said drawings, and first to Figs. 1 to 8, inclusive, a number of pre-shaped units $a$, $b$ are assembled in spaced-apart pairs, and are connected one to the other in longitudinal alignment by the clamping members hereinafter described. Each unit $a$ consists of a sheet of ferrous or non-ferrous metal or metal alloy, or any other suitable substance, which has one vertical edge turned back upon itself through two right angles as at $a^1$, and its other vertical edge shaped as at $a^2$. Units $b$, which are used at one end only of a structure, have both vertical edges turned back through two right angles as at $b^1$. Capping plates $c$, footing plates $d$, and end plates $e$ are fitted to the structure to close same, units $a$ and $b$ being shaped as at $a^3$, $b^3$ along their top and bottom edges to receive plates $c$ and $d$. The clamping means for connecting the units together in spaced and aligned relationship, and for securing plates $c$, $d$ and $e$ in position, comprise members $f$, $g$, $h$, $i$ and $j$, as shown individually and most clearly in Figs. 4 to 8, inclusive.

At intermediate positions, clamp members $f$ and $g$ are used, bolts $k$ being passed through the non-threaded aperture $g^1$ of member $g$ and engaged with the threaded aperture $f^1$ of member $f$ and tightened to clamp together the co-operating vertical edges $a^1$, $a^2$ of the adjacent units and to space the opposed pairs of units apart.

At top and bottom of the intermediate joints between the units, clamp members $i$ and $f$ are used in co-operation, members $i$ being similar to members $g$ with the addition of horizontal flanges $i^2$ having screw-threaded holes $i^3$. These latter receive flat headed screws $m$ which are passed through countersunk apertures in plates $c$ and $d$ to secure said plates in position.

At each end of the unit at top and bottom, clamp members $j$ are utilised, these being similar to members $i$ with the exception that they have a screw threaded aperture $j^1$ (instead of the plain aperture $i^1$ of member $i$) in addition to screw threaded apertures $j^3$ of flanges $j^2$. Countersink screws $n$ entered through the end plates engage apertures $j^1$ of members $j$ and secure the plates in position, and screws $m$ secure the plates $c$, $d$ by engaging apertures $j^3$.

At intermediate points between the top and bottom of the structure, end plates $e$ are secured in position by clamp members $h$ having screw-threaded holes $h^1$ for the reception of screws $n$.

Thus assembled, the units $a$ and $b$ are positively locked together to provide a cavity structure the height whereof is only limited by the manufactured, or cut off, lengths of the units, whilst the surfaces of the structure are of a pleasing flush, or "tongue and groove," appearance with no visible indication as to the means whereby said units are connected one to the other. The units may of course, be straight, or curved, or any other shape to suit requirements e.g. for corners or returns, the characteristics and method of assembly of such units being as hereinbefore described.

The vertical edges of the units $a$ and $b$ may, of course, be of shape other than shown at $a^1$, $a^2$ and $b^1$ of Fig. 1 to 3, and still retain their functional characteristics; for example, in Figs. 9 to 14 there are illustrated fragmentary cross sections of six different shapes, together with appropriate clamping members. In these figures which are self-explanatory in view of the foregoing description of Figs. 1 to 8, inclusive, $a$ generally denotes the panel units, $a^1$ the vertical edge at one side, and $a^2$ the correspondingly shaped other side. The clamping members are generally designated *x* and *y*.

Both sides of a finished structure provide a smooth surface adapted to readily receive any decorative or protective treatment, and the cavity may be filled with any type of insulating material suitable to the end in view. In cases where it is of importance to have a high degree of insulation, the clamps forming the joint may be coated, or covered, with, or consist of, insulating material.

Cavity structures as herein described can be employed in industry and the home, in the construction of ships, aircraft, vehicles, and articles such as furniture, refrigerators, machinery, and plant and appliances generally; also in the construction of illuminated signs and advertising units. The structures can be assembled before despatch or packed for transport in units for subsequent erection at their destination. Said units can be modified to suit individual requirements, and may be provided with channels, grooves, indentations or the like, to give additional strength to the material or to add to the decorative effect.

What I claim as my invention and desire to secure by Letters Patent is:

1. A cavity structure comprising pre-shaped panel units for assembly in opposed pairs, each panel unit having vertical inturned edges, co-operating members for clamping together the adjacent inturned edges of said panels so as to space apart the panel units of each pair and connect adjacent pairs of panel units in longitudinal alignment, means for tightening said co-operating members against the inturned panel edges therebetween, capping and footing plates having apertures provided therethrough, apertured and screw-threaded clamping members situated at the top and bottom of the panel units, screws passing through the apertures formed in said capping and footing plates and in threaded engagement with said clamping members apertures securing said capping and footing plates to said apertures and screw-threaded clamping members.

2. A cavity structure as claimed in claim 1, wherein said clamping members are shaped to correspond with the configuration of the inturned panel edges and have screw-threaded apertures and draw-up bolts are in threaded engagement with said apertures for adjusting the position of said clamping members relative to each other.

3. A cavity structure as claimed in claim 1, wherein said inturned vertical edges of the panel units are shaped to mate with correspondingly shaped edges of adjacent units to prevent lateral displacement of said panel units.

4. A cavity structure comprising pre-shaped panel units for assembly in opposed pairs, each panel unit having vertical inturned edges, co-operating members for clamping together the adjacent inturned edges of said panels so as to space apart the panel units of each pair and connect adjacent pairs of panel units in longitudinal alignment, means for tightening said co-operating members against the inturned panel edges therebetween, and capping and footing and end plates secured to certain of said clamping members whereby the structure is totally enclosed with said clamping members disposed internally of the structure, the clamping members situated at the top and bottom of the panel units being apertured and screw-threaded, said capping and footing plates having apertures, screws passing through the apertures formed in said capping and footing plates, and in threaded engagement with said clamping member apertures.

References Cited in the file of this patent

UNITED STATES PATENTS

| 1,012,774 | Weber | Dec. 26, 1911 |
| 1,708,351 | Auld | Apr. 9, 1929 |
| 2,442,184 | Summers | May 25, 1948 |
| 2,627,949 | Willson | Feb. 10, 1953 |

FOREIGN PATENTS

| 796,356 | France | Jan. 22, 1936 |